(12) United States Patent
Hosoya et al.

(10) Patent No.: US 7,951,490 B2
(45) Date of Patent: *May 31, 2011

(54) POSITIVE ELECTRODE ACTIVE MATTER AND SECONDARY BATTERY USING THIS

(75) Inventors: Yosuke Hosoya, Fukushima (JP); Yoshikatsu Yamamoto, Fukushima (JP)

(73) Assignee: Sony Corporation, Tokyo (JP)

( * ) Notice: Subject to any disclaimer, the term of this patent is extended or adjusted under 35 U.S.C. 154(b) by 721 days.

This patent is subject to a terminal disclaimer.

(21) Appl. No.: 11/872,609

(22) Filed: Oct. 15, 2007

(65) Prior Publication Data

US 2008/0090151 A1   Apr. 17, 2008

Related U.S. Application Data

(62) Division of application No. 10/470,505, filed as application No. PCT/JP02/12750 on Dec. 5, 2002, now Pat. No. 7,374,841.

(30) Foreign Application Priority Data

Dec. 6, 2001   (JP) .................................. 2001-373266

(51) Int. Cl.
  *H01M 4/58*   (2010.01)
  *H01M 4/00*   (2010.01)

(52) U.S. Cl. ..................... 429/231.1; 429/224; 429/223; 429/231.3; 429/231.95

(58) Field of Classification Search ............... 429/231.1, 429/223, 231.3, 224, 231.95; 423/594.4, 423/599; 252/182.1, 519.1, 521.2; 204/291, 204/292

See application file for complete search history.

(56) References Cited

U.S. PATENT DOCUMENTS 7,214,449 B2 *   5/2007   Sato et al. ................ 429/231.95

FOREIGN PATENT DOCUMENTS

| | | |
|---|---|---|
| EP | 1174937 | 1/2002 |
| EP | 1193782 | 4/2002 |
| JP | 03-049155 | 3/1991 |
| JP | 06-349493 | 12/1994 |
| JP | 07-235292 | 9/1995 |
| JP | 09-035715 | 2/1997 |
| JP | 09-180718 | 7/1997 |
| JP | 11-162466 | 6/1999 |
| JP | 11162466 | 6/1999 |
| JP | 2001-085006 | 3/2001 |
| JP | 2001-297762 | 10/2001 |
| JP | 2002-042816 | 2/2002 |
| JP | 2002-110253 | 4/2002 |
| JP | 2002-358962 | 12/2002 |

OTHER PUBLICATIONS

Japanese Office Action dated May 1, 2008 for Application No. 2001-373266.
Search Report issued on April 8, 2003 for counterpart Japanese Application No. PCT/JP02/12750.
European Search Report corresponding to European Serial No. 02783774.9.

* cited by examiner

*Primary Examiner* — Raymond Alejandro
(74) *Attorney, Agent, or Firm* — SNR Denton US LLP

(57) ABSTRACT

A secondary battery both having a cathode and an anode with a separator in between. The cathode comprises a stable complex oxide $Li_xNi_{1-y-z}Mn_yMI_zO_2$ and a highly conductive complex oxide $Li_sMII_{1-t-u}Mn_tMIII_uO_2$. Each of MI and MIII includes at least one kind selected from the group consisting of elements in Group 2 through Group 14, and MII includes at least one kind selected from the group consisting of Ni and Co, and the values of x, y, z, s, t and u are within a range of $0.9 \leq x \leq 1.1$, $0.25 \leq y \leq 0.45$, $0.01 \leq z \leq 0.30$, $0.9 \leq s \leq 1.1$, $0.05 \leq t \leq 0.20$, and $0.01 \leq u \leq 0.10$, respectively.

4 Claims, 1 Drawing Sheet

POSITIVE ELECTRODE ACTIVE MATTER AND SECONDARY BATTERY USING THIS

CROSS-RELATED APPLICATION

This application is a divisional of and claims the benefit of priority to co-pending U.S. patent application Ser. No. 10/470,505, entitled "Positive Electrode Active Matter and Secondary Battery Using This," filed Jul. 29, 2003, which is incorporated herein by reference to the extent permitted by law. This application also claims the benefit of priority to Japanese Patent Application 2001-373266, filed Dec. 6, 2001, and PCT Application No. PCT/JP02/12750, filed Dec. 5, 2002, which are also incorporated herein by reference to the extent permitted by law.

BACKGROUND OF THE INVENTION

The present invention relates to a cathode active material comprising two kinds of lithium transition metal complex oxides with different chemical compositions, and a secondary battery using the cathode active material.

In recent years, in accordance with advances in electronic technologies, a large number of small-sized portable electronic devices such as camera/VTR (video tape recorder) combination systems, cellular phones, laptop computers or the like have come into widespread, and a development for reducing their sizes and weights has proceeded. Accordingly, a development of compact and lightweight batteries having a high energy density, more specifically secondary batteries as portable power sources used in the portable electronic devices has proceeded. Among them, a lithium-ion secondary battery holds great promise, because the lithium-ion battery can obtain a higher energy density than a lead acid battery or a nickel-cadmium battery using a conventional liquid electrolyte in which water is used as a solvent.

As a cathode active material of the lithium-ion secondary battery, for example, a lithium-cobalt complex oxide and a lithium-nickel complex oxide both having a layered rock salt structure, and a lithium-manganese complex oxide having a spinel structure are practically used. Each of them has advantages and disadvantages, but at present, the lithium-cobalt complex oxide offers the most excellent balance of various aspects such as capacity, cost and thermostability, and is widely used. On the other hand, the lithium-manganese complex oxide has some disadvantages such as lower capacity, slightly poor high temperature storage characteristics or the like, and the lithium-nickel complex oxide has some disadvantages such as slightly lower thermostability and slightly lower stability of a crystalline structure, poor cycle characteristics, lower environmental resistance or the like, however, they are superior in costs and stable supply of materials, so studies of these oxides have been conducted to make use of these oxides in future.

Specifically, the lithium-nickel complex oxide is a promising material for improving the energy density, because the lithium-nickel complex oxide has a higher charge-discharge capacity. Therefore, a large number of methods of stabilizing the crystalline structure of the lithium-nickel complex oxide such as a method of substituting a different kind of element to form a solid solution, or the like have been proposed (refer to J. Solid. State. Elect rochem. 3 (1999)121 or the like).

However, in the method of substituting a different kind of element, in general, a crystalline lattice can be strengthened, and the cycle characteristics and storage characteristics can be improved, however, the method often involves a decline in the capacity or a decline in electronic conductivity and ionic conductivity. Therefore, there is a disadvantage against discharge of a large current. Moreover, with a trend in recent years toward higher density and higher speed of integrated circuits, or a growing range of uses of high power sources such as electric vehicles or the like as a backdrop, a demand for large current discharge characteristics has been growing.

In addition, in order to prevent a decline in the electronic conductivity, it is effective to increase an amount of a carbon material added to a cathode as an electronic conductor. However, this method is not preferable, because an amount of the cathode active material filled is reduced, thereby resulting in a decline in a battery capacity.

In view of the foregoing, it is an object of the present invention to provide a cathode active material exhibiting a higher capacity and superior cycle characteristics and capable of obtaining a sufficient discharge capacity during large current discharge, and a secondary battery using the cathode active material.

SUMMARY OF INVENTION

A cathode active material according to the invention comprises: a highly stable complex oxide including lithium (Li), nickel (Ni), manganese (Mn), a first element including at least one kind selected from the group consisting of elements in Group 2 through Group 14, and oxygen, wherein the composition of nickel, manganese and the first element is within a range shown in Chemical Formula 1; and a highly conductive complex oxide including lithium, a second element including at least one kind selected from the group consisting of nickel and cobalt (Co), manganese, a third element including at least one kind selected from the group consisting of elements in Group 2 through Group 14, and oxygen, wherein the composition of the second element, manganese and the third element is within a range shown in Chemical Formula 2.

$\text{Ni}_{1-y-z}\text{Mn}_y\text{MI}_z$ (Chemical Formula 1)

(where MI represents the first element, and the values of y and z are within a range of $0.25 \leq y \leq 0.45$ and $0.01 \leq z \leq 0.30$, respectively.)

$\text{MII}_{1-t-u}\text{Mn}_t\text{MIII}_u$ (Chemical Formula 2)

(where MII and MIII represent the second element and the third element, respectively, and the values of t and u are within a range of $0.05 \leq t \leq 0.20$ and $0.01 \leq u \leq 0.10$, respectively.)

A secondary battery according to the invention comprises: a cathode including a lithium complex compound; an anode including an anode active material capable of inserting and extracting lithium; and a nonaqueous electrolyte, wherein the cathode comprises: a highly stable complex oxide including lithium, nickel, manganese, a first element including at least one kind selected from the group consisting of elements in Group 2 through Group 14, and oxygen, wherein the composition of nickel, manganese and the first element is within a range shown in Chemical Formula 3, and a highly conductive complex oxide including lithium, a second element including at least one kind selected from the group consisting of nickel and cobalt, manganese, a third element including at least one kind selected from the group consisting of elements in Group 2 through Group 14, and oxygen, wherein the composition of the second element, manganese and the third element is within a range shown in Chemical Formula 4.

$\text{Ni}_{1-y-z}\text{Mn}_y\text{MI}_z$ (Chemical Formula 3)

(where MI represents the first element, and the values of y and z are within a range of $0.25 \leq y \leq 0.45$ and $0.01 \leq z \leq 0.30$, respectively)

$\text{MII}_{1-t-u}\text{Mn}_t\text{MIII}_u$ (Chemical Formula 4)

(where MII and MIII represent the second element and the third element, respectively, and the values of t and u are within a range of $0.05 \leq t \leq 0.20$ and $0.01 \leq u \leq 0.10$, respectively.)

The cathode active material according to the invention comprises the highly stable complex oxide in which amounts of substitution of manganese and the first element for nickel are larger and the highly conductive complex oxide in which amounts of substitution of manganese and the third element for the second element are smaller, so a higher capacity and superior cycle characteristics can be exhibited, and a sufficient discharge capacity during large current discharge can be obtained.

The secondary battery according to the invention uses the cathode active material according to the invention.

DETAILED DESCRIPTION OF THE PRESENTLY PREFERRED EMBODIMENTS

Figure 1:
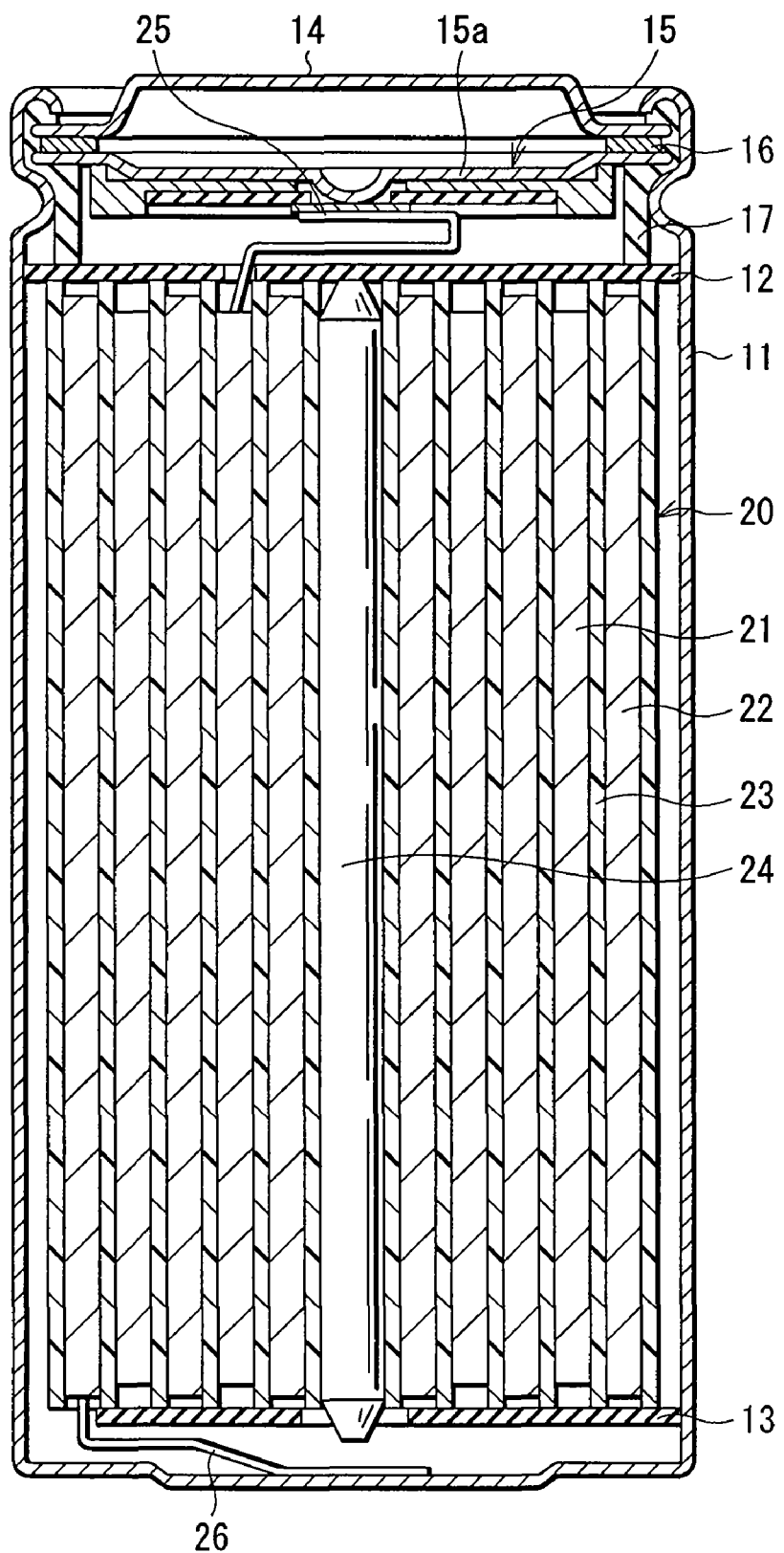
FIG. 1 is a sectional view of a secondary battery according to an embodiment of the invention.

A preferred embodiment of the invention will be described in more detail below referring to the accompanying drawing.

A cathode active material according to an embodiment of the invention comprises a highly stable complex oxide and a highly conductive complex oxide.

The highly stable complex oxide includes lithium, nickel, manganese, a first element including at least one kind selected from the group consisting of elements in Group 2 through Group 14 of the long form of the periodic table of the elements, and oxygen. Moreover, the first element includes an element except for nickel and manganese. The highly stable complex oxide has, for example, a layer structure, and in the highly stable complex oxide, manganese atoms and the first element are substituted for nickel atoms in a part of the site of the nickel atoms. The chemical formula of the highly stable complex oxide is represented by, for example, Chemical Formula 5.

$Li_xNi_{1-y-z}Mn_yMI_zO_2$ (Chemical Formula 5)

In the chemical formula, MI represents the first element, and the values of x, y and z are preferably within a range of $0.9 \leq x \leq 1.1$, $0.25 \leq y \leq 0.45$ and $0.01 \leq z \leq 0.30$, respectively. The composition of oxygen is stoichiometrically determined, and may deviate from a stoichiometric composition.

The highly conductive complex oxide includes lithium, a second element including at least one kind selected from the group consisting of nickel and cobalt, manganese, a third element including at least one kind selected from the group consisting of elements in Group 2 through Group 14 of the long form of the periodic table of the elements, and oxygen. The third element includes an element except for the second element and manganese. The highly conductive complex oxide has, for example, a layer structure, and in the highly conductive complex oxide, manganese atoms and the third element are substituted for the second element in a part of the site of the second element. The chemical formula of the highly conductive complex oxide is represented by, for example, Chemical Formula 6.

$Li_sMII_{1-t-u}Mn_tMIII_uO_2$ (Chemical Formula 6)

In the chemical formula, MII and MIII represent the second element and the third element, respectively, and the values of s, t and u are preferably within a range of $0.9 \leq s < 1.1$, $0.05 \leq t \leq 0.20$ and $0.01 \leq u \leq 0.10$, respectively. The composition of oxygen is stoichiometrically determined, and may deviate from a stoichiometric composition.

In the highly stable complex oxide and the highly conductive complex oxide, the crystalline structure is stabilized by substituting other elements for a part of nickel or the second element, however, the capacity or the electronic conductivity declines according to an increase in the amount of substitution. Therefore, in the embodiment, the highly stable complex oxide, in which the amounts of substitution of manganese and the first element are increased with the emphasis on stability of the crystalline structure, and the highly conductive complex oxide, in which the amounts of substitution of manganese and the third element are reduced with the emphasis on the electronic conductivity, are mixed so as to achieve superior cycle characteristics, a higher capacity and a sufficient discharge capacity during large current discharge.

As shown in Chemical Formula 5, the composition $Ni_{1-y-z}Mn_yMI_z$ of nickel, manganese and the first element in the highly stable complex oxide is within a range of $0.25 \leq y \leq 0.45$ and $0.01 \leq z \leq 0.30$, because when the amount of substitution is smaller than the range, sufficient cycle characteristics cannot be obtained, and when the amount of substitution is larger than the range, the discharge capacity during large current discharge declines. As shown in Chemical Formula 6, the composition $MII_{1-t-u}Mn_tMIII_u$ of the second element, manganese and the third element in the highly conductive complex oxide is within a range of $0.05 \leq t \leq 0.20$ and $0.01 \leq u \leq 0.10$, because of the same reason.

As the first element and the third element, publicly known elements which can be uniformly dispersed in crystal can be used. More specifically, at least one kind selected from the group consisting of cobalt, iron (Fe), aluminum (Al), chromium (Cr), vanadium (V), titanium (Ti), magnesium (Mg) and gallium (Ga) is preferably used, because higher effects can be obtained.

The mixture ratio of the highly conductive complex oxide to the highly stable complex oxide is preferably from 85 wt % to 15 wt % to from 15 wt % to 85 wt %, and more preferably from 70 wt % to 30 wt % to from 30 wt % to 70 wt %. When the amount of the highly stable complex oxide is not large enough, the cycle characteristics decline, and when the amount of the highly conductive complex oxide is not large enough, the discharge capacity during large current discharge declines.

The specific surface area of the highly stable complex oxide is preferably 0.40 m²/g or over according to, for example, BET (Brunauer Emmett Teller) theory. When the specific surface area is smaller than 0.40 m²/g, a contact area to an electrolyte is reduced, and the transfer of lithium ions according to charge and discharge is inhibited, thereby the discharge capacity during large current discharge declines.

The specific surface area of the highly conductive complex oxide is preferably 0.10 m²/g or over according to, for example, BET theory. The highly conductive complex oxide has higher electronic conductivity than the highly stable complex oxide, so in the highly conductive complex oxide, lithium ions are easily transferred. However, when the specific surface area is less than 0.10 m²/g, the discharge capacity during large current discharge declines in like manner.

Each specific surface area of the highly stable complex oxide and the highly conductive complex oxide is preferably 2.0 m²/g or less according to, for example, BET theory. When the specific surface area is larger than 2.0 m²/g, a contact area to the electrolyte is too large, so the decomposition of the electrolyte according to charge and discharge advances, thereby the cycle characteristics decline.

Each particle of the highly stable complex oxide and the highly conductive complex oxide preferably has the shape of a secondary particle formed through agglomerating primary particles with a particle diameter of less than 5 μm. The particle diameter of the primary particle specifically means the maximum particle diameter. When the particle diameter of the primary particle is larger than 5 μm, the particle is destroyed by expansion and shrinkage according to charge and discharge, thereby the cycle characteristics decline.

The average particle diameter of the secondary particle is preferably 30 μm or less, and more preferably within a range of from 2 μm to 30 μm. When the average particle diameter is larger than 30 μm, the highly stable complex oxide and the highly conductive complex oxide are not sufficiently mixed, thereby large current discharge characteristics cannot be improved. Moreover, when the average particle diameter is smaller than 2 μm, the filling capacity of the particle largely declines, so contact between particles declines by expansion and shrinkage according to charge and discharge, thereby the cycle characteristics decline. The secondary particle is not limited to agglomeration of the primary particles of the highly stable complex oxide or agglomeration of the primary particles of the highly conductive complex oxide, and may be agglomeration of a mixture of the primary particles of the highly stable complex oxide and the primary particles of the highly conductive complex oxide.

The highly stable complex oxide and the highly conductive complex oxide can be obtained through mixing, for example, inorganic salts of lithium, nickel, manganese and the first element in a solution, or mixing inorganic salt of lithium, the second element, manganese and the third element in a solution, and then heating and firing a complex hydroxide obtained by coprecipitation in an air atmosphere or an oxygen atmosphere at a temperature ranging from 600 degree C. to 1100 degree C. At this time, instead of the complex hydroxide including the above elements, a complex carbonate, an organic acid salt, an oxide, an inorganic salt or the like including the above elements may be used as a material. A method of synthesizing the highly stable complex oxide and the highly conductive complex oxide is not limited to the above method, and as long as the above-described composition and physical properties can be achieved, any other method such as solid-phase synthesis, hydrothermal synthesis or the like may be used. Moreover, a publicly known mixing method can be used to mix the highly stable complex oxide and highly conductive complex oxide, and particles of either of the highly stable complex oxide and the highly conductive complex oxide are adhered to particles of the other of them so as to combine them.

Such a cathode material is used for a cathode of the following secondary battery, for example.

FIG. 1 shows a sectional view of a secondary battery using the cathode material according to the embodiment. The secondary battery is a so-called cylindrical battery, and comprises a spirally wound electrode body 20 including a strip-shaped cathode 21 and a strip-shaped anode 22 spirally wound with a separator 23 in between in a hollow cylindrical-shaped battery can 11. The battery can 11 is made of, for example, nickel-plated iron. An end portion of the battery can 11 is closed, and the other end portion thereof is opened. In the battery can 11, a pair of insulating plates 12 and 13 are disposed so that the spirally wound electrode body 20 is sandwiched there between in a direction perpendicular to a spirally wound peripheral surface.

In the opened end portion of the battery can 11, a battery cover 14 and, a safety valve mechanism 15 and a positive temperature coefficient device (PTC device) 16 disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to higher than a certain extent due to an internal short circuit or external application of heat, a disk plate 15a is flipped so as to disconnect the electrical connection between the battery cover 14 and the spirally wound electrode body 20. When a temperature rises, the PTC device 16 limits current flow by an increased resistance, thereby resulting in preventing abnormal heat generation by a large current. The PTC device 16 is made of, for example, barium titanate semiconductor ceramic. The gasket 17 is made of, for example, an insulating material, and its surface is coated with asphalt.

The spirally wound electrode body 20 is wound around, for example, a center pin 24. A cathode lead 25 made of aluminum or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded so as to be electrically connected to the battery can 11.

The cathode 21 includes, for example, a cathode mixed layer and a cathode current collector layer, and has a structure in which the cathode mixed layer is disposed on either side or both sides of the cathode current collector layer. The cathode current collector layer is made of, for example, metal foil such as aluminum foil, nickel foil, stainless foil or the like. The cathode mixed layer includes a cathode active material including a mixture of the above highly stable complex oxide and the above highly conductive complex oxide, and further includes an electronic conductor such as graphite and a binder such as polyvinylidene fluoride, if necessary.

The anode 22 has, for example, a structure in which an anode mixed layer is disposed on either side or both sides of an anode current collector layer as in the case of the cathode 21. The anode current collector layer is made of, for example, metal foil such as copper foil, nickel foil, stainless foil or the like. The anode mixed layer includes one kind or two or more kinds selected from the group consisting of lithium metal and an anode material capable of inserting and extracting lithium at, for example, a potential of 2.0 V or less based upon the potential of lithium metal as an anode active material, and further includes a binder such as polyvinylidene fluoride or the like, if necessary.

As the anode material capable of inserting and extracting lithium, for example, a carbonaceous material is cited. The carbonaceous material is preferable because superior cycle characteristics can be obtained. As the carbonaceous material, for example, non-graphitizable carbon, artificial graphite, natural graphite, kinds of pyrolytic carbon, kinds of coke (pitch coke, needle coke, petroleum coke or the like), kinds of graphite, kinds of glass-like carbon, an organic high molecular weight compound fired body (a phenolic resin, a furan resin or the like carbonized through firing at a suitable temperature), a carbon fiber, activated carbon and kinds of carbon black are cited.

As the anode material capable of inserting and extracting lithium, a metal element or a metalloid element which can be alloyed with lithium, an alloy or a compound thereof is cited. They are preferable, because higher energy density can be obtained, and more specifically, they are preferably used with a carbonaceous material, because higher energy density and superior charge-discharge cycle characteristics can be obtained. The alloy in the description includes an alloy including one or more kinds of metal elements and one or more kinds of metalloid elements in addition to an alloy including two or more kinds of metal elements. The composition of the alloy includes a solid solution, a eutectic alloy (eutectic mixture), an intermetallic compound or coexistence of two or more kinds thereof.

As the metal element and the metalloid element, tin (Sn), lead (Pb), aluminum, indium (In), silicon (Si), zinc (Zn), antimony (Sb), bismuth (Bi), cadmium (Cd), magnesium, boron (B), gallium, germanium (Ge), arsenic (As), silver (Ag), zirconium (Zr), yttrium (Y) or hafnium (Hf) is cited. As an alloy or a compound thereof, for example, an alloy or a compound represented by a chemical formula $Ma_fMb_gLi_h$, or a chemical formula $Ma_iMc_jMd_k$. In these chemical formulas, Ma represents at least one kind selected from the group consisting of the metal elements and the metalloid elements which can be alloyed with lithium, and Mb represent at least one kind selected from the group consisting of the metal elements and the metalloid elements except for lithium and Ma, and Mc represents at least one kind selected from non-metal elements, and Md represents at least one kind selected from the group consisting of metal elements and metalloid elements except for Ma. Further, the values of f, g, h, i, j and k are $f>0$, $g\geqq0$, $h\geqq0$, $i>0$, $j>0$ and $k\geqq0$, respectively.

Among them, a metal element or a metalloid element in Group 4B, an alloy or a compound thereof is preferable, and silicon or tin, or an alloy or a compound thereof is more preferable. They may be crystalline or amorphous.

As specific examples of such an alloy and such a compound, LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSiS$, $VSi_2$, $WSi_2$, $ZnSi_2$, SiC, $Si_3N_4$, $Si_2N_2O$, $SiO_v$ ($0<v\leqq2$), $SnO_w$ ($0<w\leqq2$), $SnSiO_3$, LiSiO, LiSnO or the like is cited.

As the anode material capable of inserting and extracting lithium, an oxide, a nitride or the like which can insert and extract lithium at a relatively base potential such as iron oxide, ruthenium oxide, molybdenum oxide, tungsten oxide, titanium oxide or the like is cited.

The separator 23 is made of, for example, a porous film of polyolefin-based material such as polypropylene, polyethylene or the like, or a porous film of an inorganic material such as nonwoven fabric made of ceramic, and the separator 23 may have a structure in which two or more kinds of the porous films are laminated.

The separator 23 is impregnated with an electrolyte solution which is a liquid nonaqueous electrolyte. The electrolyte solution is formed through dissolving, for example, lithium salt as electrolyte salt in a solvent. Any solvent which is used for batteries of this kind can be used as the solvent. For example, a nonaqueous solvent such as propylene carbonate, ethylene carbonate, diethyl carbonate, dimethyl carbonate, 1,2-dimethoxyethane, 1,2-diethoxyethane, .gamma.-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetate, butyrate, propionate or the like is preferable, and one kind or a mixture of two or more kinds selected from them is used.

As the lithium salt, for example, $LiClO_4$, $LiAsF_6$, $LiPF_6$, $LiBF_4$, $LiB(C_6H_5)_4$, $CH_3SO_3L_1$, $CF_3SO_3Li$, LiCl, LiBr or the like is cited, and one kind or a mixture of two or more kinds selected from them is used.

Moreover, instead of the electrolyte solution, any other electrolyte such as a gel electrolyte in which a high molecular weight compound holds an electrolyte solution, a solid high molecular weight electrolyte in which lithium salt is dispersed in a high molecular weight compound with ionic conductivity, a solid inorganic electrolyte or the like may be used.

For the gel electrolyte, various high molecular weight compounds which absorb the electrolyte solution to be gelled can be used. As such a high molecular weight compound, for example, a fluorine-based high molecular weight compound such as polyvinylidene fluoride or a copolymer of vinylidene fluoride and hexafluoropropylene, an ether-based high molecular weight compound such as polyethylene oxide, a cross-link including polyethylene oxide or the like, or polyacrylonitrile is cited. Among them, the fluororine-based high molecular weight compound is preferable because it has high stability of oxidation-reduction.

For the solid high molecular weight electrolyte, as the high molecular weight compound, for example, an ether-based high molecular weight compound such as polyethylene oxide, a cross-link including polyethylene oxide or the like, an ester-based high molecular weight compound such as polymethacrylate or the like, an acrylate-based high molecular weight compound, a mixture thereof, or any of the above high molecular weight compounds which is copolymerized can be used.

Further, as the inorganic electrolyte, a polycrystal of lithium nitride, lithium iodide or lithium hydroxide, a mixture of lithium iodide and chromium trioxide, a mixture of lithium iodide, lithium sulfide and phosphorus subsulfide can be used.

The secondary battery can be manufactured through, for example, the following steps.

At first, the highly stable complex oxide and the highly conductive complex oxide, and, if necessary, the electronic conductor and the binder are mixed to prepare a cathode mixture, then the cathode mixture is dispersed in a solvent such as N-methyl-2-pyrrolidone or the like to produce a cathode mixture slurry in paste form. After the cathode mixture slurry is applied to the cathode current collector layer, and the solvent is dried, the cathode mixed layer is formed through compression molding by a roller press or the like so as to form the cathode 21.

Next, for example, the anode active material, and if necessary, the binder are mixed to prepare an anode mixture, then the anode mixture is dispersed in a solvent such as N-methyl-2-pyrrolidone or the like to produce an anode mixture slurry in paste form. After the anode mixture slurry is applied to the anode current collector layer, and the solvent is dried, the anode mixed layer is formed through compression molding by a roller press or the like so as to form the anode 22.

Then, the cathode lead 25 is derived from the cathode current collector layer, and the anode lead 26 is derived from the anode current collector layer. After that, for example, a laminate including the cathode 21 and anode 22 with the separator 23 in between is spirally wound, and an end portion of the cathode lead 25 is welded to the safety valve mechanism 15, and an end portion of the anode lead 26 is welded to the battery can 11. Then, the spirally wound laminate including the cathode 21 and the anode 22 sandwiched between a pair of insulating plates 12 and 13 is contained in the battery can 11. After the spirally wound laminate including the cathode 21 and the anode 22 is contained in the battery can 11, the electrolyte (for example, an electrolyte solution) is injected into the battery can 11, and the separator 23 is impregnated with the electrolyte. After that, the battery cover 14, the safety valve mechanism 15 and the PTC device 16 are fixed in an opening end portion of the battery can 11 through caulking by the gasket 17. Thereby, the secondary battery shown in FIG. 1 is formed.

The secondary battery works as follows.

In the secondary battery, when charge is carried out, for example, lithium ions are extracted from the cathode 21, and are inserted into the anode 22 through the electrolyte with which the separator 23 is impregnated. When discharge is carried out, for example, the lithium ions are extracted from the anode 22, and are inserted into the cathode 21 through the electrolyte with which the separator 23 is impregnated. In this case, the cathode 21 includes the highly stable complex oxide and the highly conductive complex oxide, so superior cycle characteristics and a higher and sufficient discharge capacity during large current discharge can be obtained.

Thus, in the cathode active material according to the embodiment, the highly stable complex oxide having the composition represented by, for example, Chemical Formula 5 and the highly conductive complex oxide having the composition represented by, for example, Chemical Formula 6 are included, so superior cycle characteristics and a higher and sufficient discharge capacity during large current discharge can be obtained. Therefore, when the secondary battery according to the embodiment is used in an apparatus including an integrated circuit with higher density and higher speed, or as a high power source used in an electric vehicle or the like, sufficient discharge characteristics can be obtained.

Moreover, when the mixture ratio of the highly conductive complex oxide to the highly stable complex oxide is within a range of from 85 wt % to 15 wt % to from 15 wt % to 85 wt %, and more specifically within a range of from 70 wt % to 30 wt % to from 30 wt % to 70 wt %, higher effects can be obtained.

Further, when the specific surface area of the highly stable complex oxide is 0.40 m$^2$/g or over, and the specific surface area of the highly conductive complex oxide is 0.10 m$^2$/g or over, the transfer of lithium ions according to charge and discharge can be more easily carried out, and the discharge capacity during large current discharge can be further improved.

Moreover, when each specific surface area of the highly stable complex oxide and the highly conductive complex oxide is 2.0 m$^2$/g or less, the decomposition of the electrolyte according to charge and discharge can be prevented, and the cycle characteristics can be further improved.

In addition, when each particle of the highly stable complex oxide and the highly conductive complex oxide has the shape of a secondary particle formed through agglomerating primary particles with a particle diameter of less than 5 μm, the particles can be prevented from being destroyed by expansion and shrinkage according to charge and discharge, thereby the cycle characteristics can be further improved.

Still further, when the average particle diameters of the secondary particles of the highly stable complex oxide and the highly conductive complex oxide are 30 μm or less, the highly stable complex oxide and the highly conductive complex oxide are sufficiently mixed with each other, so the discharge characteristics during large current discharge can be further improved.

Next, specific examples of the invention will be described in more detail below referring to FIG. 1.

EXAMPLES 1-1 THROUGH 1-5

At first, the highly stable complex oxide LiNi$_{0.70-y}$Mn$_y$Co$_{0.30}$O$_2$ was prepared. More specifically, commercially available nickel nitrate, manganese nitrate and cobalt nitrate were used to form a nickel nitrate solution, a manganese nitrate solution and a cobalt nitrate solution, respectively, and the solutions were mixed so that a molar ratio of nickel, manganese and cobalt became 0.70-y:y:0.30, and an ammonia solution was dropped in the mixed solutions while sufficiently stirring so as to obtain a complex hydroxide. The value of y varied among Examples 1-1 through 1-5 as shown in Table 1. The obtained complex hydroxide was mixed with lithium hydroxide, and after the mixture of the complex hydroxide and lithium hydroxide was fired in an oxygen airflow at 800 degree C. for 10 hours, the mixture was pulverized so as to obtain the highly stable complex oxide.

When the obtained powders of Examples 1-1 through 1-5 were analyzed by atomic absorption spectrometry, the composition of LiNi$_{1-y}$Mn$_y$Co$_{0.30}$O$_2$ was discovered. Moreover, when the particle diameters of the powders were measured by a laser diffraction method, the average particle diameter was 10 μm, and when the specific surface area was measured according to BET theory, it was 0.6 m$^2$/g. Further, when the X-ray diffractions of the powders were measured, the obtained patterns were similar to the pattern of LiNiO$_2$ in 09-0063 of ICDD (International Centre for Diffraction Data), and it was confirmed that the patterns had the same layered rock salt structure as LiNiO$_2$. In addition, when the powders were observed by a scanning electron microscope (SEM), secondary particles formed through agglomerating primary particles with a particle diameter ranging from 0.1 μm to 4 μm were observed.

Next, the highly conductive complex oxide LiNi$_{0.70-t}$Co$_{0.25}$Mn$_t$Al$_{0.05}$O$_2$ was prepared. More specifically, commercially available nickel nitrate, cobalt nitrate, manganese nitrate and aluminum nitrate were used to form a nickel nitrate solution, a cobalt nitrate solution, a manganese nitrate solution and an aluminum nitrate solution, respectively, and the solutions were mixed so that a molar ratio of nickel, cobalt, manganese and aluminum became 0.70-t:0.25:t:0.05, and an ammonia solution was dropped in the mixed solutions while sufficiently stirring so as to obtain a complex hydroxide. The value of t varied among Examples 1-1 through 1-5 as shown in Table 1. The obtained complex hydroxide was mixed with lithium hydroxide, and after the mixture of the complex hydroxide and lithium hydroxide was fired in an oxygen airflow at 800 degree C. for 10 hours, the mixture was pulverized so as to obtain the highly conductive complex oxide.

When the obtained powders of Examples 1-1 through 1-5 were analyzed by atomic absorption spectrometry, the composition of LiNi$_{0.70-t}$Co$_{0.25}$Mn$_t$Al$_{0.05}$O$_2$ was discovered. Moreover, when the particle diameters of the powders were measured by the laser diffraction method, the average particle diameter was 15 μm, and when the specific surface area was measured according to BET theory, it was 0.4 m$^2$/g. Further, when the X-ray diffractions of the powders were measured, the obtained patterns were similar to the pattern of LiNiO$_2$ in 09-0063 of ICDD, and it was confirmed that the patterns had the same layered rock salt structure as LiNiO$_2$. In addition, when the powders were observed by the SEM, second particles formed through agglomerating primary particles with a particle diameter ranging from 0.1 μm to 4 μm were observed.

Next, the obtained highly stable complex oxide and the obtained highly conductive complex oxide were mixed at a mass ratio of the highly stable complex oxide: the highly conductive complex oxide=50:50 so as to obtain the cathode active material. After that, 86 wt % of the cathode active material, 10 wt % of graphite as an electronic conductor and 4 wt % of polyvinylidene fluoride as a binder were mixed, and the mixture was dispersed in N-methyl-2-pyrrolidone to produce a cathode mixture slurry. After the cathode mixture slurry was uniformly applied to both sides of a strip-shaped cathode current collector layer made of aluminum foil with a thickness of 20 μm, and was dried, the cathode mixed layer was formed through compression molding by a roller press to form the strip-shaped cathode 21. When the filling density of the cathode 21 was measured, it was 3.2 g/cm$^3$. After that, the cathode lead 25 made of aluminum was attached to an end portion of the cathode current collector layer.

Moreover, artificial graphite in powder form was prepared as the anode active material, and 90 wt % of the artificial graphite and 10 wt % of polyvinylidene fluoride as a binder were mixed to prepare the anode mixture. Then, the anode mixture was dispersed in N-methyl-2-pyrrolidone to produce an anode mixture slurry. After the anode mixture slurry was produced, the anode mixture slurry was uniformly applied to both sides of a strip-shaped anode current collector layer made of copper foil with a thickness of 10 µm, and was dried, the anode mixed layer was formed through compression molding by the roller press to form the strip-shaped anode 22. After that, the anode lead 26 made of nickel was attached to an end portion of the anode current collector layer.

After the cathode 21 and the anode 22 were formed, the separator 23 made of a microporous polypropylene film was prepared, the anode 22, the separator 23, the cathode 21 and the separator 23 were laminated in order, and were spirally wound many times to form the spirally wound electrode body 20.

After the spirally wound electrode body 20 was formed, the spirally wound electrode body 20 was sandwiched between a pair of insulating plates 12 and 13, and the anode lead 26 was welded to a bottom portion of the battery can 11, and the cathode lead 25 was welded to a projected portion of the safety valve mechanism 15, and then the spirally wound electrode body 20 was contained in the battery can 11 made of nickel-plated iron. After that, the electrolyte solution was injected into the battery can 11. As the electrolyte solution, a mixed solvent containing ethylene carbonate and methyl ethyl carbonate at a volume ratio of 1:1 in which $LiPF_6$ as the electrolyte salt was dissolved at a ratio of 1 mol/l was used. Finally, the battery cover 14 was caulked into the battery can 11 by the gasket 17 so as to fix the safety valve mechanism 15, the PTC device 16 and the battery cover 14. Thereby, the cylindrical secondary batteries shown in FIG. 1 with an outside diameter of 18 mm and a height of 65 mm in Examples 1-1 through 1-5 were formed.

A high-load discharge test and a charge-discharge cycle test were carried out on the secondary batteries of Examples 1-1 through 1-5 obtained through the above steps. The obtained results are shown in Table 1.

The high-load discharge test was carried out as follows. At first, after the secondary battery was charged at an environmental temperature of 23 degree C., a charge voltage of 4.20 V, a charge current of 1000 mA, and a charge time of 2.5 hours, the battery was discharged at a discharge current of 800 mA and a cutoff voltage of 2.75 V to determine an initial discharge capacity. Next, after the battery was charged in the same conditions, high-load discharge was carried out at a discharge current of 5000 mA and a cutoff voltage of 2.75 V, and the discharge capacity during high load discharge (that is, during large current discharge) was measured, and a ratio of the capacity to the initial discharge capacity was determined. A formula for determining the ratio was the capacity ratio during high-load discharge=(the discharge capacity during high load discharge/the initial discharge capacity)×100.

Moreover, in the charge-discharge cycle test, charge-discharge cycles were repeated in the same conditions as those when the initial discharge capacity was measured, and a discharge capacity in the hundredth cycle was determined, then a capacity retention ratio of the discharge capacity in the hundredth cycle to the initial discharge capacity was determined. A formula for determining the ratio was the cycle capacity retention ratio=(the discharge capacity in the hundredth cycle/the initial discharge capacity)×100.

As Comparative Examples 1-1 through 1-4 relative to Examples 1-1 through 1-5, the secondary batteries were formed as in the case of Examples 1-1 through 1-5, except that the composition of the highly stable complex oxide $LiNi_{0.70-y}Mn_yCo_{0.30}O_2$ or the composition of the highly conductive complex oxide $LiNi_{0.70-t}Co_{0.25}Mn_tAl_{0.05}O_2$ varied as shown in Table 1. The high-load discharge test and the charge-discharge cycle test were carried out on Comparative Examples 1-1 through 1-4 in the same manner as Examples 1-1 through 1-5. The obtained results are shown in Table 1.

As shown in Table 1, in Examples 1-1 through 1-5, the capacity ratio during high-load discharge was as good as 70% or over, and the cycle capacity retention ratio was as good as 90% or over. On the other hand, in Comparative Example 1-1 in which the amount of substitution of manganese in the highly stable complex oxide was smaller and Comparative Example 1-3 in which the amount of substitution of manganese in the highly conductive complex oxide was smaller, the capacity ratio during high-load discharge was high, but the cycle capacity retention ratio was lower. Moreover, in Comparative Example 1-2 in which the amount of substitution of manganese in the highly stable complex oxide was larger and Comparative Example 1-4 in which the amount of substitution of manganese in the highly conductive complex oxide was larger, the cycle capacity retention ratio was high, but the capacity ratio during high-load discharge was lower.

In other words, it was found out that when the highly stable complex oxide in which the composition $Ni_{1-y-z}Mn_yMI_z$ including nickel, manganese and the first element MI was within a range of $0.25 \leq y \leq 0.45$ and the highly conductive complex oxide in which the composition $MII_{1-t-u}Mn_tMIII_u$ including the second element MII, manganese and the third element MIII was within a range of $0.05 \leq t \leq 0.20$ were mixed, excellent values of the cycle characteristics and high-load discharge characteristics could be obtained.

EXAMPLES 1-6 THROUGH 1-18

In Examples 1-6 through 1-12, the secondary batteries were formed as in the case of Example 1-2, except that the highly stable complex oxide $LiNi_{0.70-z}Mn_{0.30}MI_zO_2$ was formed with the first element MI varied as shown in Table 2. Moreover, in Examples 1-13 through 1-18, the secondary batteries were formed as in the case of Example 1-2, except that the highly conductive complex oxide $LiNi_{0.65-u}Co_{0.25}Mn_{0.10}MIII_uO_2$ was formed with the third element MIII varied as shown in Table 2. At that time, as the materials of the highly stable complex oxide and the highly conductive complex oxide, iron nitrate, aluminum nitrate, chromium nitrate, vanadium pentoxide, titanium oxide, magnesium hydroxide or gallium nitrate was used instead of cobalt nitrate or aluminum nitrate.

The high-load discharge test and the charge-discharge cycle test were carried out on Examples 1-6 through 1-18 as in the same manner as Example 1-2. The obtained results are shown in Table 2 together with the results of Example 1-2. As shown in Table 2, in Examples 1-6 through 1-18, as in the case of Example 1-2, the capacity ratio during high-load discharge was as good as 70% or over, and the cycle capacity retention ratio was as good as 90% or over.

In other words, it was found out that even if any other element except for cobalt was used as the first element MI, or even if any other element except for aluminum was used as the third element MIII, the results similar to those in Example 1-2 were obtained. Moreover, it was found out that when the composition $Ni_{1-y-z}Mn_yMI_z$ of nickel, manganese and the first element MI in the highly stable complex oxide was within a range of $0.01 \leqq z \leqq 0.30$, and the composition $MIII_{1-t-u}Mn_t$-$MIII_u$ of the second element MIII, manganese and the third element MIII in the highly conductive complex oxide was within a range of $0.01 \leqq t \leqq 0.10$, excellent values of the cycle characteristics and the high-load discharge characteristics could be obtained.

EXAMPLES 2-1 THROUGH 2-6

The secondary batteries were formed as in the case of Example 1-2, except that the mixture ratio of the highly stable complex oxide $LiNi_{0.40}Mn_{0.30}Co_{0.30}O_2$ and the highly conductive complex oxide $LiNi_{0.60}Co_{0.25}Mn_{0.10}Al_{0.05}O_2$ varied among Examples 2-1 through 2-6 as shown in Table 3. The high-load discharge test and the charge-discharge cycle test were carried out on Examples 2-1 through 2-6 in the same manner as Example 1-2. The obtained results are shown in Table 3 together with the results of Example 1-2.

As shown in Table 3, the higher the mixture ratio of the highly stable complex oxide was, the higher the cycle capacity retention ratio became, and the higher the mixture ratio of the highly conductive complex oxide was, the higher the capacity ratio during high-load discharge became. Among Examples, in Example 1-2 and Examples 2-2 through 2-5, the cycle capacity retention ratio could be 89% or over, and the capacity ratio during high-load discharge could be 69% or over, and in Example 1-2, Example 2-3 and Example 2-4, the cycle capacity retention ratio could be improved to be 92% or over, and the capacity ratio during high-load discharge could be improved to be 73% or over.

In other words, it was found out that when the mixture ratio of the highly conductive complex oxide to the highly stable complex oxide was within a range of from 85 wt % to 15 wt % to from 15 wt % to 85 wt %, more specifically within a range of from 70 wt % to 30 wt % to from 30 wt % to 70 wt %, better values of the cycle characteristics and high-load discharge characteristics could be obtained.

EXAMPLES 3-1 THROUGH 3-8

The secondary batteries were formed as in the case of Example 1-2, except that the specific surface area of the highly stable complex oxide $LiNi_{0.40}Mn_{0.30}Co_{0.30}O_2$ or the highly conductive complex oxide $LiNi_{0.60}Co_{0.25}Mn_{0.10}Al_{0.05}O_2$ varied among Examples 3-1 through 3-8 as shown in Table 4 or Table 5. The high-load discharge test and the charge-discharge cycle test were carried out on Examples 3-1 through 3-8. The obtained results are shown in Table 4 or Table 5 together with the results of Example 1-2.

As shown in Table 4 and Table 5, in the highly stable complex oxide and the highly conductive complex oxide, the larger the specific surface area was, the higher the capacity ratio during high-load discharge became. However, in Examples 3-4 and 3-8 in which the specific surface area of the highly stable complex oxide or the highly conductive complex oxide was larger than 2.0 m²/g, a steep decline in the cycle capacity retention ratio was observed. Among Examples, in Examples 3-2, 1-2 and 3-3 in which the specific surface area of the highly stable complex oxide was from 0.4 m²/g to 2.0 m²/g and Examples 3-6, 1-2 and 3-7 in which the specific surface area of the highly conductive complex oxide was from 0.10 m²/g to 2.0 m²/g, the capacity ratio during high-load discharge could be 70% or over, and the cycle capacity retention ratio could be 90% or over.

In other words, it was found out that when the specific surface area of the highly stable complex oxide was within a range of from 0.4 m²/g to 2.0 m²/g, and the specific surface area of the highly conductive complex oxide was within a range of from 0.1 m²/g to 2.0 m²/g, better values of the cycle characteristics and the high-load discharge characteristics could be obtained.

EXAMPLES 4-1 and 4-2

The secondary batteries were formed as in the case of Example 1-2, except that the particle diameters of the primary particles of the highly stable complex oxide $LiNi_{0.40}Mn_{0.30}Co_{0.30}O_2$ and the highly conductive complex oxide $LiNi_{0.60}Co_{0.25}Mn_{0.05}Al_{0.50}O_2$ varied between Examples 4-1 and 4-2 as shown in Table 6. In Example 4-2, the secondary particle was not formed through agglomerating the primary particles, and a particle in massive form was used. The high-load discharge test and the charge-discharge cycle test were carried out on Examples 4-1 and 4-2 in the same manner as Example 1-2. The obtained results are shown in Table 6 together with the results of Example 1-2.

As shown in Table 6, in Example 1-2 in which the particle diameter of the primary particle was smaller, the capacity ratio during high-load discharge and the cycle capacity retention ratio were higher than those in Examples 4-1 and 4-2. In other words, it was found out that when each particle of the highly stable complex oxide and the highly conductive complex oxide had the shape of the secondary particle formed through agglomerating the primary particles with a particle diameter of less than 5 μm, better values of the cycle characteristics and high-load discharge characteristics could be obtained.

EXAMPLES 5-1 THROUGH 5-13

The secondary batteries were formed as in the case of Example 1-2, except that the average particle diameters of the secondary particles of the highly stable complex oxide $LiNi_{0.40}Mn_{0.30}Co_{0.30}O_2$ and the highly conductive complex oxide $LiNi_{0.60}Co_{0.25}Mn_{1.10}Al_{0.05}O_2$ varied among Examples 5-1 through 5-13 as shown in Table 7 or Table 8. The high-load discharge test and the charge-discharge cycle test were carried out on Examples 5-1 through 5-13 in the same manner as Example 1-2. The obtained results are shown in Table 7 or Table 8 together with the results of Example 1-2.

As shown in Table 7 and Table 8, there was a tendency that when the average particle diameters of the secondary particles of the highly stable complex oxide and the highly conductive complex oxide became larger, the capacity ratio during high-load discharge and the cycle capacity retention ratio became higher, and after the capacity ratio and the cycle capacity retention ratio reached the maximum values, the values declined. More specifically, in Examples 5-7 and 5-13 in which the average particle diameter of the secondary particle in either the highly stable complex oxide or the highly conductive complex oxide was larger than 30 μm, a steep decline in the high-load discharge characteristics was observed. Among Examples, in Examples 1-2, 5-2 through 5-6, and 5-9 through 5-12 in which the average particle diameters of the secondary particles were from 2 μm to 30 μm, the capacity ratio during high-load discharge could be 70% or over, and the cycle capacity retention ratio could be 90% or over.

In other words, it was found out that when the average particle diameters of the secondary particles of the highly stable complex oxide and the highly conductive complex oxide were within a range of 30 μm or less, more specifically within a range from 2 μm to 30 g m, better values of the cycle characteristics and the high-load discharge characteristics could be obtained.

In the above Examples, the compositions of the highly stable complex oxide and the highly conductive complex oxide are described referring to specific examples, however, even when any other composition within a range described in the above embodiment is used, similar results can be obtained.

Although the present invention is described referring to the embodiment and Examples, the invention is not limited to the embodiment and Examples, and is variously modified. For example, in the embodiment and Examples, the cylindrical secondary battery having a spirally wound structure is specifically described, however, the invention can be applied to a secondary battery with any other shape such as a prismatic shape, a coin shape, a button shape, a shape in which an electrode device is sealed in a laminate film or the like in the same manner. Further, the invention may be applied to a secondary battery with any other structure such as a structure in which the cathode and the anode are laminated with the separator in between. In addition, in the case of a prismatic shaped secondary battery having a spirally wound structure, the internal diameter of a core is a diameter of a portion with the largest curvature in an oval shaped core used when spirally winding.

Moreover, in the embodiment and Examples, a method of producing the cathode and the anode is described referring to an example. However, the cathode active material or the anode active material to which a binder or the like is added may be heated and then applied. Further, the cathode active material, the anode active material, a mixture including the cathode active material, an electrically conductive material and a binder or a mixture including the anode active material, an electrically conductive material and a binder may be molded.

As described above, in the cathode active material according to the invention, the highly stable complex oxide and the highly conductive complex oxide are included, so superior cycle characteristics and a higher and sufficient discharge capacity during large current discharge can be obtained.

In the cathode active material according to an aspect of the invention, the mixture ratio of the highly conductive complex oxide to the highly stable complex oxide is within a range of from 85 wt % to 15 wt % to from 15 wt % to 85 wt %, so the cycle characteristics and the discharge capacity during large current discharge can be further improved.

In the cathode active material according to another aspect of the invention, the specific surface area of the highly stable complex oxide is within a range of from 0.40 m$^2$/g to 2.0 m$^2$/g inclusive, or the specific surface area of the highly conductive complex oxide is within a range of from 0.10 m$^2$/g to 2.0 m$^2$/g inclusive, so the transfer of lithium ions according to charge and discharge can be more easily carried out, thereby the discharge capacity during large current discharge can be further improved, and the decomposition of the electrolyte according to charge and discharge can be prevented, thereby the cycle characteristics can be further improved.

In the cathode active material according to still another aspect of the invention, each particle of the highly stable complex oxide and the highly conductive complex oxide has the shape of a secondary particle formed through agglomerating the primary particles with a particle diameter of less than 5 μm, so the particles can be prevented from being destroyed by expansion and shrinkage according to charge and discharge, thereby the cycle characteristics can be further improved.

In addition, in the cathode active material according to a further aspect of the invention, the average particle diameters of the secondary particles of the highly stable complex oxide and the highly conductive complex oxide are 30 μm or less, so the highly stable complex oxide and the highly conductive complex oxide can be sufficiently mixed, thereby the discharge characteristics at large current can be further improved.

Moreover, in the secondary battery according to the invention, the cathode comprises the highly stable complex oxide and the highly conductive complex oxide, so even if the secondary battery is applied to an apparatus including an integrated circuit with higher density and higher speed, or as a high power source used for an electric vehicle or the like, sufficient discharge characteristics can be obtained.

Obviously many modifications and variations of the present invention are possible in the light of the above teachings. It is therefore to be understood that within the scope of the appended claims the invention may be practiced otherwise than as specifically described.

1 TABLE 1

|  | COMPOSITION OF HIGHLY STABLE COMPLEX OXIDE y | COMPOSITION OF HIGHLY STABLE COMPLEX OXIDE y | CAPACITY RATION DURING HIGH-LOAD DISCHARGE (%) | CYCLE CAPACITY RETENTION RATION (%) |
|---|---|---|---|---|
| EXAMPLE 1-1 | 0.25 | 0.10 | 79.3 | 90.5 |
| EXAMPLE 1-2 | 0.30 | 0.10 | 76.4 | 93.6 |
| EXAMPLE 1-3 | 0.45 | 0.10 | 72.5 | 94.8 |
| EXAMPLE 1-4 | 0.30 | 0.05 | 77.7 | 93.0 |
| EXAMPLE 1-5 | 0.30 | 0.20 | 71.3 | 94.0 |
| COMPARATIVE EXAMPLE 1-1 | 0.20 | 0.10 | 81.1 | 82.6 |
| COMPARATIVE EXAMPLE 1-2 | 0.50 | 0.10 | 61.3 | 95.9 |
| COMPARATIVE EXAMPLE 1-3 | 0.30 | 0.01 | 82.3 | 80.4 |
| COMPARATIVE EXAMPLE 1-4 | 0.30 | 0.25 | 62.4 | 95.2 |

HIGHLY STABLE COMPLEX OXIDE LiNi$_{0.70-y}$Mn$_y$Co$_{0.30}$O$_2$
HIGHLY CONDUCTIVE COMPLEX OXIDE LiNi$_{0.70-t}$Co$_{0.25}$Mn$_t$Al$_{0.05}$O$_2$

TABLE 2

| | COMPOSITION OF HIGHLY STABLE COMPLEX OXIDE | | COMPOSITION OF HIGHLY CONDUCTIVE COMPLEX OXIDE | | CAPACITY RATIO DURING HIGH-LOAD DISCHARGE (%) | CYCLE CAPACITY RETENTION RATIO (%) |
|---|---|---|---|---|---|---|
| | MI | z | MIII | u | | |
| EXAMPLE 1-2 | Co | 0.30 | Al | 0.05 | 76.4 | 93.6 |
| EXAMPLE 1-6 | Fe | 0.20 | Al | 0.05 | 76.0 | 94.9 |
| EXAMPLE 1-7 | Al | 0.10 | Al | 0.05 | 77.1 | 95.2 |
| EXAMPLE 1-8 | Cr | 0.05 | Al | 0.05 | 75.2 | 94.3 |
| EXAMPLE 1-9 | V | 0.05 | Al | 0.05 | 75.3 | 96.7 |
| EXAMPLE 1-10 | Ti | 0.05 | Al | 0.05 | 74.8 | 93.5 |
| EXAMPLE 1-11 | Mg | 0.15 | Al | 0.05 | 78.0 | 94.5 |
| EXAMPLE 1-12 | Ga | 0.05 | Al | 0.05 | 75.2 | 96.1 |
| EXAMPLE 1-13 | Co | 0.30 | Fe | 0.10 | 77.3 | 94.1 |
| EXAMPLE 1-14 | Co | 0.30 | Cr | 0.10 | 74.8 | 93.8 |
| EXAMPLE 1-15 | Co | 0.30 | V | 0.05 | 76.4 | 95.6 |
| EXAMPLE 1-16 | Co | 0.30 | Ti | 0.05 | 73.9 | 96.0 |
| EXAMPLE 1-17 | Co | 0.30 | Mg | 0.05 | 79.0 | 94.3 |
| EXAMPLE 1-18 | Co | 0.30 | Ga | 0.05 | 75.9 | 93.8 |

HIGHLY STABLE COMPLEX OXIDE $LiNi_{0.70-z}Mn_{0.30}MI_zO_2$
HIGHLY CONDUCTIVE COMPLEX OXIDE $LiNi_{0.65-u}Co_{0.25}Mn_{0.10}MIII_uO_2$

TABLE 3

| | MIXTURE RATIO | | CAPACITY RATION DURING HIGH-LOAD DISCHARGE (%) | CYCLE CAPACITY RETENTION RATION (%) |
|---|---|---|---|---|
| | HIGHLY STABLE COMPLEX OXIDE (WT %) | HIGHLY CONDUCTIVE COMPLEX OXIDE (WT %) | | |
| EXAMPLE 2-1 | 10 | 90 | 83.6 | 81.5 |
| EXAMPLE 2-2 | 15 | 85 | 80.3 | 89.3 |
| EXAMPLE 2-3 | 30 | 70 | 78.2 | 92.1 |
| EXAMPLE 1-2 | 50 | 50 | 76.4 | 93.6 |
| EXAMPLE 2-4 | 70 | 30 | 73.2 | 94.2 |
| EXAMPLE 2-5 | 85 | 15 | 69.7 | 96.1 |
| EXAMPLE 2-6 | 90 | 10 | 61.1 | 96.0 |

TABLE 4

| | SPECIFIC SURFACE AREA ($m^2/g$) | | CAPACITY RATION DURING HIGH-LOAD DISCHARGE (%) | CYCLE CAPACITY RETENTION RATION (%) |
|---|---|---|---|---|
| | HIGHLY STABLE COMPLEX OXIDE | HIGHLY CONDUCTIVE COMPLEX OXIDE | | |
| EXAMPLE 3-1 | 0.2 | 0.4 | 68.1 | 92.3 |
| EXAMPLE 3-2 | 0.4 | 0.4 | 74.0 | 94.5 |
| EXAMPLE 1-2 | 0.6 | 0.4 | 76.4 | 93.6 |
| EXAMPLE 3-3 | 1.9 | 0.4 | 78.6 | 90.3 |
| EXAMPLE 3-4 | 2.4 | 0.4 | 79.3 | 82.1 |

TABLE 5

| | SPECIFIC SURFACE AREA ($m^2/g$) | | CAPACITY RATION DURING HIGH-LOAD DISCHARGE (%) | CYCLE CAPACITY RETENTION RATION (%) |
|---|---|---|---|---|
| | HIGHLY STABLE COMPLEX OXIDE | HIGHLY CONDUCTIVE COMPLEX OXIDE | | |
| EXAMPLE 3-5 | 0.6 | 0.06 | 63.3 | 91.1 |
| EXAMPLE 3-6 | 0.6 | 0.1 | 72.7 | 93.0 |
| EXAMPLE 1-2 | 0.6 | 0.4 | 76.4 | 93.6 |
| EXAMPLE 3-7 | 0.6 | 1.8 | 77.5 | 90.5 |
| EXAMPLE 3-8 | 0.6 | 2.5 | 80.1 | 79.2 |

TABLE 6

| | PARTICLE DIAMETER OF PRIMARY PARTICLE OF HIGHLY STABLE COMPLEX OXIDE AND HIGHLY CONDUCTIVE COMPLEX OXIDE | CAPACITY RATION DURING HIGH-LOAD DISCHARGE (%) | CYCLE CAPACITY RETENTION RATION (%) |
|---|---|---|---|
| | HIGHLY STABLE COMPLEX OXIDE HIGHLY CONDUCTIVE COMPLEX OXIDE | | |
| EXAMPLE 1-2 | 0.1-4.0 | 76.4 | 93.6 |
| EXAMPLE 4-1 | 0.1-8.0 | 64.1 | 78.2 |
| EXAMPLE 4-2 | 12 (MASSIVE PARTICLE) | 42.2 | 58.0 |

TABLE 7

| | AVERAGE [ARTICLE DIAMETER OF SECONDARY PARTICLE (μm) | | CAPACITY RATION DURING HIGH-LOAD DISCHARGE (%) | CYCLE CAPACITY RETENTION RATION (%) |
|---|---|---|---|---|
| | HIGHLY STABLE COMPLEX OXIDE | HIGHLY CONDUCTIVE COMPLEX OXIDE | | |
| EXAMPLE 5-1 | 1 | 15 | 79.3 | 87.8 |
| EXAMPLE 5-2 | 2 | 15 | 79.6 | 92.3 |
| EXAMPLE 5-3 | 7 | 15 | 77.3 | 91.2 |
| EXAMPLE 1-2 | 10 | 15 | 76.4 | 93.6 |
| EXAMPLE 5-4 | 21 | 15 | 73.2 | 92.8 |
| EXAMPLE 5-5 | 27 | 15 | 71.2 | 89.3 |
| EXAMPLE 5-7 | 38 | 15 | 58.2 | 87.6 |

TABLE 8

| | AVERAGE [ARTICLE DIAMETER OF SECONDARY PARTICLE (μm) | | CAPACITY RATION DURING HIGH-LOAD DISCHARGE (%) | CYCLE CAPACITY RETENTION RATION (%) |
|---|---|---|---|---|
| | HIGHLY STABLE COMPLEX OXIDE | HIGHLY CONDUCTIVE COMPLEX OXIDE | | |
| EXAMPLE 5-8 | 10 | 1 | 77.4 | 89.1 |
| EXAMPLE 5-9 | 10 | 2 | 78.0 | 92.9 |
| EXAMPLE 5-10 | 10 | 9 | 78.1 | 94.1 |
| EXAMPLE 1-2 | 10 | 15 | 76.4 | 93.6 |
| EXAMPLE 5-11 | 10 | 19 | 74.3 | 92.2 |
| EXAMPLE 5-12 | 10 | 28 | 72.6 | 90.7 |
| EXAMPLE 5-13 | 10 | 39 | 64.3 | 86.2 |

What is claimed is:

1. A secondary battery, comprising:
a cathode including a stable complex oxide and a stable conductive oxide;
an anode including an anode active material capable of inserting and extracting lithium; and
a nonaqueous electrolyte,
wherein,
z
the stable complex oxide includes (a) lithium, (b) nickel, (c) manganese, (d) a first element including at least one kind selected from the group consisting of elements in Group 2 through Group 14, and (e) oxygen,
the composition of nickel, manganese and the first element in the stable complex oxide are within a range defined by the formula $Ni_{1-y-z}Mn_yMI_z$, where MI represents the first element and the values of y and z are within a range of $0.25<y<0.45$ and $0.01<z<0.30$, respectively,
the conductive complex oxide includes (a) lithium, (b) a second element including at least one kind selected from the group consisting of nickel and cobalt (Co), (c) manganese, (d) a third element including at least one kind selected from the group consisting of elements in Group 2 through Group 14 and (e) oxygen,
the composition of the second element, manganese and the third element in the conductive complex oxide is defined by the formula $MII_{1-t-u}Mn_tMIII_u$ where MII and MIII represent the second element and the third element, respectively, and the values of t and u are within a range of $0.05<t<0.20$ and $0.01<u<0.10$, respectively, and
the third element includes $Ni_w$, where $w>0.5$.

2. A secondary battery according to claim 1, wherein a mixture ratio of the conductive complex oxide to the stable complex oxide is from 85 wt % to 15 wt % to from 15 wt % to 85 wt %.

3. A secondary battery according to claim 1, wherein a specific surface area of the stable complex oxide is within a range of from 0.40 m²/g to 2.0 m²/g inclusive, and a specific surface area of the highly conductive complex oxide is within a range of from 0.10 m²/g to 2.0 m²/g inclusive.

4. A secondary battery according to claim 1, wherein each particle of the stable complex oxide and the conductive complex oxide has the shape of a secondary particle formed through agglomerating primary particles with a particle diameter of less than 5 pm, and the average particle diameter of the secondary particle is 30 pm or less.

* * * * *